(12) United States Patent
Bernatchez (10) Patent No.: US 12,136,807 B2
(45) Date of Patent: Nov. 5, 2024

(54) LOCKED ROTOR PROTECTION SYSTEM AND METHOD FOR ELECTRIC VEHICLE

(71) Applicant: TAIGA MOTORS INC., Lasalle (CA)

(72) Inventor: Gabriel Bernatchez, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 50 days.

(21) Appl. No.: 17/700,975

(22) Filed: Mar. 22, 2022

(65) Prior Publication Data

US 2022/0311236 A1 Sep. 29, 2022

Related U.S. Application Data (60) Provisional application No. 63/166,330, filed on Mar. 26, 2021.

(51) Int. Cl.
  *H02P 6/08* (2016.01)
  *H02H 7/08* (2006.01)
  *G05B 19/042* (2006.01)

(52) U.S. Cl.
  CPC ............. *H02H 7/0833* (2013.01); *H02P 6/08* (2013.01); *G05B 19/0423* (2013.01)

(58) Field of Classification Search
  CPC ..... H02H 7/0833; H02P 6/08; H02P 2205/05; H02P 29/027; G05B 19/0423; G05B 19/042; G05B 2219/2637; B60L 2200/00; B60L 2240/423; B60L 2240/642; B60L 15/20; B60L 15/2018
  See application file for complete search history.

(56) References Cited

U.S. PATENT DOCUMENTS

| | | | |
|---|---|---|---|
| 7,096,099 B2 | 8/2006 | Itoh | |
| 7,228,925 B2 | 6/2007 | Hightower | |
| 8,694,188 B2 | 4/2014 | Miyamoto et al. | |
| 8,768,550 B2 | 7/2014 | Saito | |
| 8,998,771 B2 * | 4/2015 | Pietron | B60W 10/02 903/946 |
| 10,421,490 B2 * | 9/2019 | Lavoie | B62D 5/0481 |
| 10,759,409 B2 * | 9/2020 | Ashrafi | B60W 30/18054 |
| 2009/0066281 A1 * | 3/2009 | West | B60L 3/00 340/648 |
| 2016/0194038 A1 * | 7/2016 | Jean | B62D 55/244 305/15 |
| 2016/0280258 A1 * | 9/2016 | Lavoie | B62D 5/0481 |
| 2019/0176804 A1 * | 6/2019 | Liang | B60W 10/08 |
| 2019/0232940 A1 * | 8/2019 | Ashrafi | B60W 10/192 |
| 2020/0140037 A1 | 5/2020 | Haavikko et al. | |
| 2022/0009589 A1 | 1/2022 | Matsushita | |

(Continued)

FOREIGN PATENT DOCUMENTS

| | | |
|---|---|---|
| WO | 2019049109 A1 | 3/2019 |
| WO | 2021084520 A2 | 5/2021 |

*Primary Examiner* — Thai T Dinh
(74) *Attorney, Agent, or Firm* — Norton Rose Fulbright Canada LLP (57) ABSTRACT

Systems and methods for providing locked rotor protection for powertrains of electric vehicles are provided. One method for operating an electric vehicle includes receiving a command for propelling the electric vehicle, driving an electric motor of the powertrain of the electric vehicle, and determining that the powertrain is obstructed. After determining that the powertrain is obstructed, an output is generated to initiate one or more actions intended to protect the powertrain.

24 Claims, 10 Drawing Sheets

(56) References Cited

U.S. PATENT DOCUMENTS

2022/0017181 A1 1/2022 Suzuki et al.
2022/0063764 A1 3/2022 Matsushita
2022/0111929 A1 4/2022 Matsushita

* cited by examiner

| Motor Drive Current | Motor Output Torque |
|---|---|
| C1 | T1 |
| C2 | T2 |
| C3 | T3 |

| Angle of Inclination of Vehicle | Torque Threshold |
|---|---|
| α1 | TT1 |
| α2 | TT2 |
| α3 | TT3 |

FIG-9

| Angle of Inclination of Vehicle | Electric Current Threshold |
|---|---|
| α1 | CT1 |
| α2 | CT2 |
| α3 | CT3 |

FIG-10

| Load Carried by Vehicle | Torque Threshold |
|---|---|
| L1 | TT4 |
| L2 | TT5 |
| L3 | TT6 |

FIG-11

| Load Carried by Vehicle | Electric Current Threshold |
|---|---|
| L1 | CT4 |
| L2 | CT5 |
| L3 | CT6 |

LOCKED ROTOR PROTECTION SYSTEM AND METHOD FOR ELECTRIC VEHICLE

CROSS-REFERENCE TO RELATED APPLICATION(S)

This application claims priority from U.S. Provisional Patent Application No. 63/166,330, filed Mar. 26, 2021, which is incorporated by reference in its entirety herein.

TECHNICAL FIELD

The disclosure relates generally to electric vehicles, and more particularly to locked rotor protection for electric powersport vehicles.

BACKGROUND

Due to their relatively quiet, clean and efficient powertrains, electric powersport vehicles can be desirable to powersport enthusiasts. Some powersport vehicles are operated off-road in relatively rugged terrain and objects found in such rugged terrain could potentially obstruct the powertrain of a powersport vehicle. In some situations, an operator of the powersport vehicle may notice the obstruction and eliminate the obstruction before continuing to operate the vehicle to prevent damaging the vehicle. However, in some situations, the occurrence of such obstruction may initially not be apparent to the operator. Improvement is desirable.

SUMMARY

In one aspect, the disclosure describes a method of operating an electric vehicle. The method comprises:
  receiving a first input indicative of a command for propelling the electric vehicle;
  after receiving the first input, driving an electric motor of a powertrain of the electric vehicle;
  receiving a second input indicative of one or more parameters of the powertrain while the electric motor is being driven;
  determining, based on the second input, that the powertrain is obstructed; and
  after determining that the powertrain is obstructed, generating an output that initiates one or more actions.

The second input may include an operating speed of the electric motor. The second input may include an output torque of the electric motor. The second input may be indicative of an amount of electric power supplied to the electric motor.

The second input may be indicative of an output torque of the electric motor and an operating speed of the electric motor. Determining that the powertrain is obstructed may include: determining that the operating speed of the electric motor is equal to or below a speed threshold; and determining that the output torque of the electric motor is equal to or above a torque threshold.

The torque threshold may be variable. The torque threshold may be based on an inclination of the electric vehicle. The torque threshold may be based on a load carried by the electric vehicle.

The second input may be indicative of an amount of electric power supplied to the electric motor when the electric motor is driven. The method may include inferring the output torque of the electric motor based on the second input.

The second input may include a magnitude of an electric current supplied to the electric motor and an operating speed of the electric motor when the electric motor is driven. Determining that the powertrain is obstructed may include: determining that the operating speed of the electric motor is equal to or below a speed threshold; and determining that the magnitude of the electric current supplied to the electric motor is equal to or above a current threshold.

The current threshold may be variable. The current threshold may be based on an inclination of the electric vehicle. The current threshold may be based on a load carried by the electric vehicle.

The one or more actions may include ceasing to drive the electric motor. The one or more actions may include reducing the electric power supplied to the electric motor. The one or more actions may include generating an indication perceivable by an operator of the electric vehicle.

The indication may include a visual indication. The indication may include an audible indication. The indication may include a haptic indication.

The electric vehicle may be a snowmobile. The electric vehicle may be a utility task vehicle.

Embodiments may include combinations of the above features.

In another aspect, the disclosure describes a locked rotor protection system for an electric vehicle. The system comprises:
  one or more sensors operatively connected to a powertrain of the electric vehicle for sensing one or more parameters of the powertrain;
  one or more data processors operatively connected to the one or more sensors; and
  non-transitory machine-readable memory storing instructions executable by the one or more data processors and configured to cause the one or more data processors to:
    when an electric motor of the powertrain of the electric vehicle is being driven, use data indicative of the one or more parameters of the powertrain to determine that the powertrain is obstructed; and
    after determining that the powertrain is obstructed, generate an output that initiates one or more actions.

The one or more parameters of the powertrain may be indicative of an output torque of the electric motor and an operating speed of the electric motor. Determining that the powertrain is obstructed may include: determining that the operating speed of the electric motor is equal to or below a speed threshold; and determining that the output torque of the electric motor is equal to or above a torque threshold.

The instructions may be configured to cause the one or more data processors to infer the output torque of the electric motor based on a magnitude of an electric current supplied to the electric motor when the electric motor is driven.

The one or more parameters of the powertrain may include a magnitude of an electric current supplied to the electric motor and an operating speed of the electric motor when the electric motor is driven. Determining that the powertrain is obstructed may include: determining that the operating speed of the electric motor is equal to or below a speed threshold; and determining that the magnitude of the electric current supplied to the electric motor is equal to or above a current threshold.

The one or more actions may include ceasing to drive the electric motor. The one or more actions may include generating an indication perceivable by an operator of the electric vehicle.

Embodiments may include combinations of the above features.

In a further aspect, the disclosure describes an electric powersport vehicle comprising a system as described herein.

In a further aspect, the disclosure describes an electric powersport vehicle with locked rotor protection. The electric powersport vehicle comprises:
- a powertrain for propelling the electric powersport vehicle, the powertrain including an electric motor and a battery for supplying electric power to the electric motor;
- an accelerator for receiving an input indicative of a command for propelling the electric vehicle from an operator of the electric powersport vehicle; and
- a controller operatively connected to the accelerator and to the powertrain, the controller being configured to:
- in response to the input received at the accelerator, drive the electric motor of the powertrain;
- determine that the powertrain is obstructed by:
- determining that an operating speed of the electric motor is equal to or below a speed threshold; and
- determining at least one of the following: that an amount of electric power supplied to the electric motor is equal to or above a power threshold, and that an output torque of the electric motor is equal to or above a torque threshold; and
- after determining that the powertrain is obstructed, generate an output that initiates one or more actions for protecting the powertrain.

The one or more actions may include generating an indication perceivable by the operator of the electric vehicle. The one or more actions may include ceasing to drive the electric motor.

The electric powersport vehicle may be a snowmobile. The electric powersport vehicle may be a utility task vehicle.

Embodiments may include combinations of the above features.

In a further aspect, the disclosure describes a computer program product for implementing a locked rotor protection function on an electric vehicle, the computer program product comprising a non-transitory computer readable storage medium having program code embodied therewith, the program code readable and executable by a computer, processor or logic circuit to perform a method as described herein.

In a further aspect, the disclosure describes a computer program product for implementing a locked rotor protection function on an electric powersport vehicle, the computer program product comprising a non-transitory computer readable storage medium having program code embodied therewith, the program code readable and executable by a computer, processor or logic circuit to perform a method comprising:
- when an electric motor of a powertrain of the electric powersport vehicle is driven in response to an input received at an accelerator of the electric powersport vehicle, determining that the powertrain is obstructed by:
- determining that an operating speed of the electric motor is equal to or below a speed threshold; and
- determining at least one of the following: that an amount of electric power supplied to the electric motor is equal to or above a power threshold, and that an output torque of the electric motor is equal to or above a torque threshold; and
- after determining that the powertrain is obstructed, generating an output that initiates one or more actions for protecting the powertrain.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to systems and associated methods for providing locked rotor protection for powertrains of electric vehicles. In some embodiments, the systems and methods described herein may be suitable for electric powersport vehicles that may be operated off-road and/or in relatively rugged environments. Examples of suitable electric powersport vehicles include snowmobiles, personal watercraft (PWCs), all-terrain vehicles (ATVs), and (e.g., side-by-side) utility task vehicles (UTVs). In some embodiments, the systems and methods described herein may, based on one or more operating parameters of a powertrain of the electric vehicle, determine that the powertrain is obstructed, and automatically initiate one or more actions intended to protect the powertrain.

In some embodiments, the systems and methods described herein may alert an operator of the electric vehicle and/or prevent an electric motor of the powertrain from being driven beyond a prescribed output torque in the event that the powertrain is obstructed. Obstruction of the powertrain may be caused by a parking brake of the electric vehicle being inadvertently left applied when initiating propulsion of the electric vehicle, or by a foreign object (e.g., rock, boulder, branch) obstructing the operation of the powertrain of the electric vehicle for example. The obstruction of the powertrain may result in a rotor of an electric motor of the vehicle being locked.

The terms "connected" and "coupled to" may include both direct connection and coupling (in which two elements contact each other) and indirect connection and coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
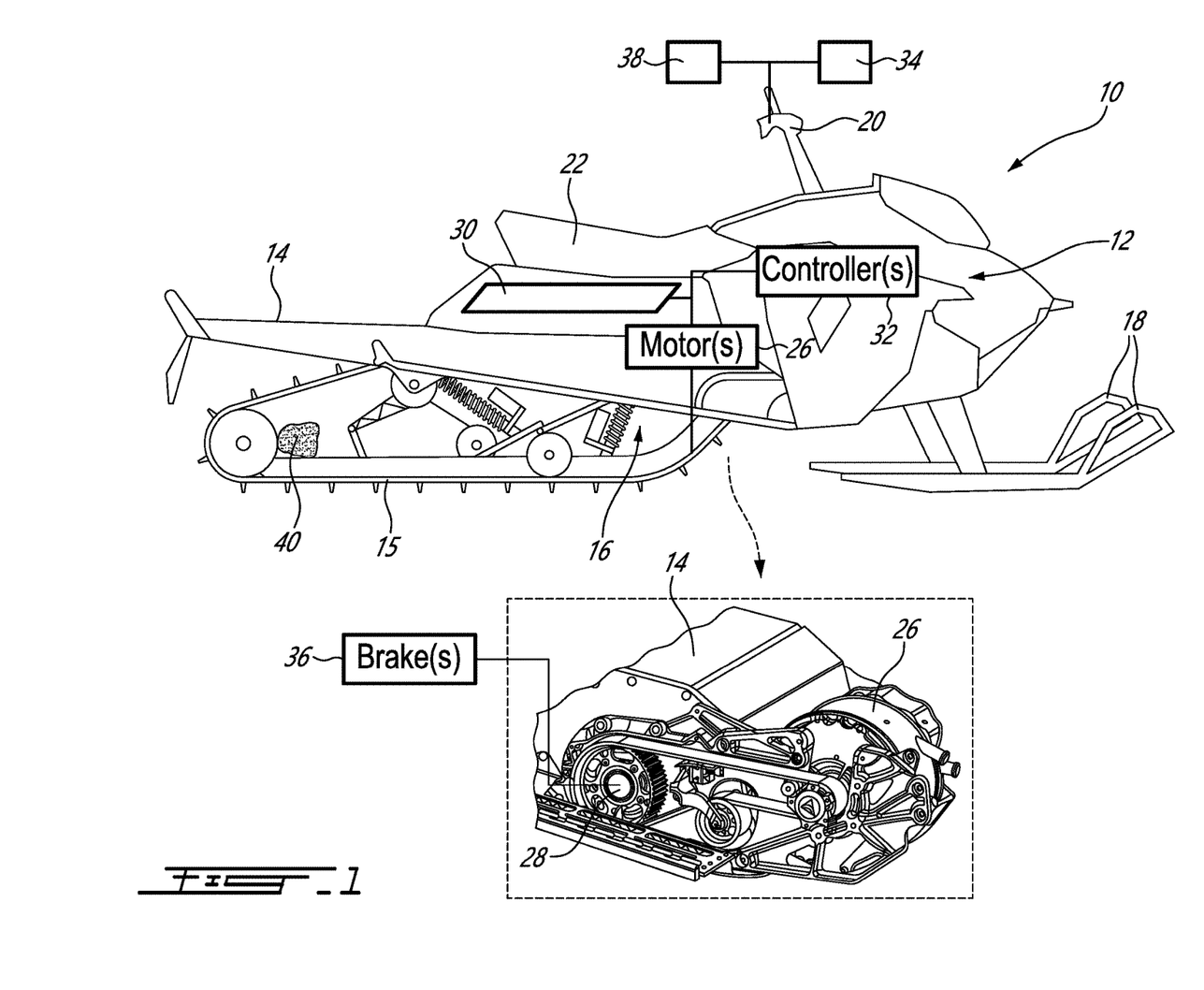
FIG. 1 is a schematic representation of an electric powersport vehicle including a locked rotor protection system as described herein.

FIG. 1 is a schematic representation of an exemplary powersport electric vehicle 10 (referred hereinafter as "vehicle 10") including locked rotor protection system 12 (referred hereinafter as "system 12") as described herein. As illustrated in FIG. 1, vehicle 10 may be a snowmobile but it is understood that the systems described herein may also be used on other types of electric vehicles such as electric UTVs, electric ATVs, electric PWCs, and other electric powersport vehicles. Vehicle 10 may include other components such as a windshield and an instrument panel that are omitted from FIG. 1 for clarity. In some embodiments, vehicle 10 may be an electric snowmobile including elements of the snow vehicle described in International Patent Application no. WO 2019/049109 A1 (Title: BATTERY ARRANGEMENT FOR ELECTRIC SNOW VEHICLES), which is incorporated herein by reference.

Vehicle 10 may include a frame (also known as a chassis) which may include tunnel 14, track 15 having the form of an endless belt for engaging the ground and disposed under tunnel 14, powertrain 16 mounted to the frame and configured to drive track 15, left and right skis 18 disposed in a front portion of vehicle 10, straddle seat 22 disposed above tunnel 14 for accommodating an operator of vehicle 10 and optionally one or more passengers (not shown). Skis 18 may be movably attached to the frame to permit steering of vehicle 10 via a steering assembly including a steering column interconnecting handlebar 20 with skis 18.

Powertrain 16 of vehicle 10 may include one or more electric motors 26 (referred hereinafter in the singular) drivingly coupled to track 15 via drive shaft 28. As shown in the inset of FIG. 1, electric motor 26 may be in torque-transmitting engagement with drive shaft 28 via a belt/pulley drive. However, motor 26 may be in torque-transmitting engagement with drive shaft 28 via other arrangements such as a chain/sprocket drive, or shaft/gear drive for example. Drive shaft 28 may be drivingly coupled to track 15 via one or more toothed wheels or other means so as to transfer motive power from motor 26 to track 15.

Powertrain 16 may also include one or more batteries 30 (referred hereinafter in the singular) for providing electric power to motor 26 and driving motor 26. The operation of motor 26 and the delivery of electric power to motor 26 may be controlled by controller 32 based on an actuation of accelerator 34, also referred to as "throttle", by the operator. In some embodiments, battery 30 may be a lithium ion or other type of battery. In various embodiments, motor 26 may be a permanent magnet synchronous motor or a blushless direct current motor for example.

Vehicle 10 may also include one or more brakes 36 (referred hereinafter in the singular) that may be applied or released by an actuation of brake actuator (e.g., lever) 38 by the operator for example. Brake 36 may be operable as a main brake for the purpose of slowing and stopping vehicle 10 during motion of vehicle 10. Alternatively or in addition, brake 36 may be operable as a parking brake, sometimes called "e-brake" or "emergency brake", of vehicle 10 intended to be used when vehicle 10 is stationary. In various embodiments, such main and parking brake functions may use separate brakes, or may use a common brake 36. In some embodiments, brake actuator 38 may be lockable when brake 36 is applied in order to use brake 36 as a parking brake. Brake 36 may be electrically or hydraulically operated. For example, brake 36 may include a master cylinder operatively connected to a brake calliper that urges bake pads against a brake rotor or disk that is coupled to powertrain 16. In some embodiments, such brake rotor may be secured to and rotatable with drive shaft 28.

As explained further below, system 12 may be used to protect components of powertrain 16 when powertrain 16 is obstructed (e.g., locked). FIG. 1 shows an exemplary object 40 obstructing the operation of powertrain 16. Such object 40 may, for example, include a rock, a boulder, or a branch that may be stuck in track 15 and interfere with the movement of track 15. System 12 may protect components of powertrain 16 due to various types of obstructions including brake 36 being inadvertently applied when accelerator 34 is actuated.

Figure 2:
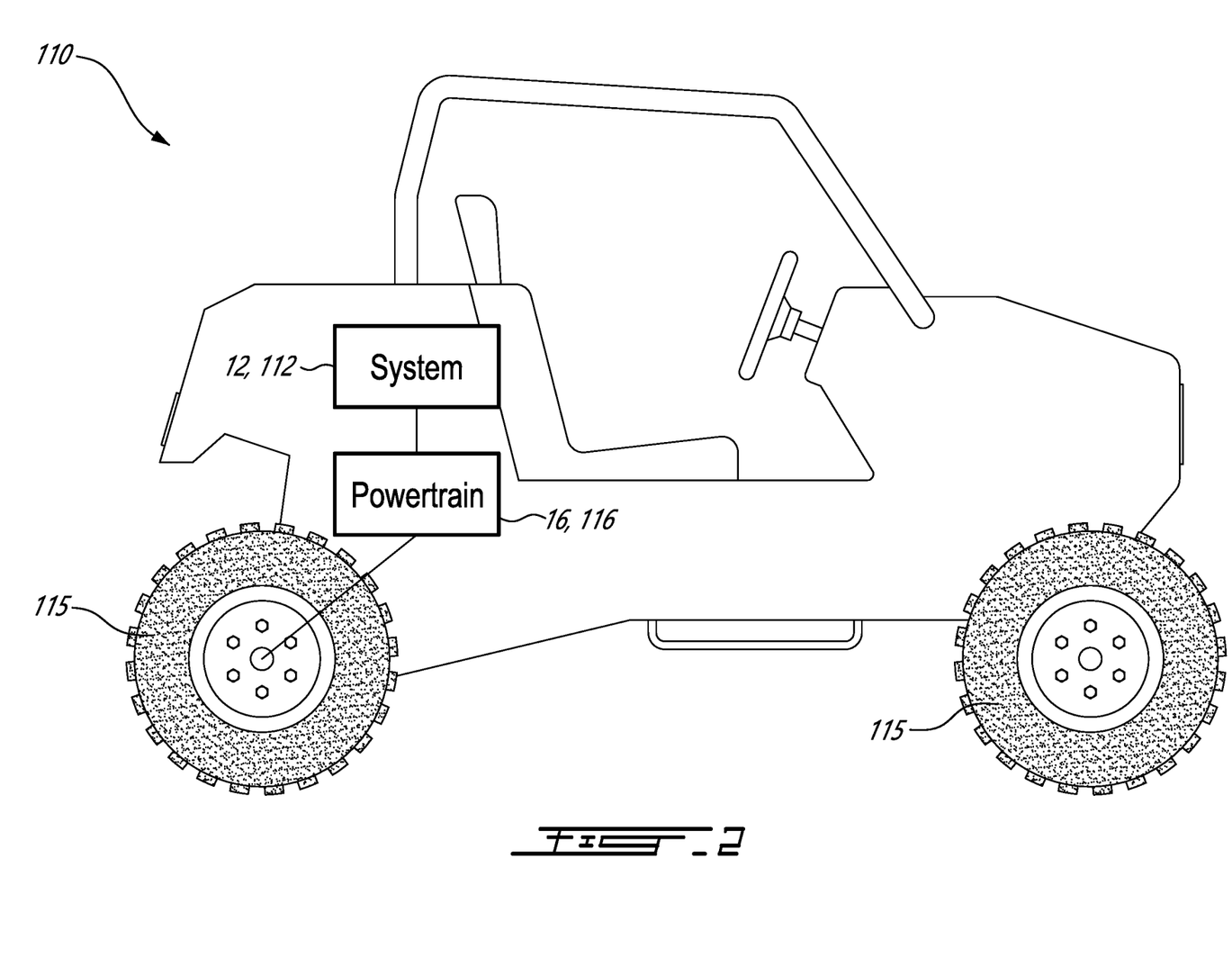
FIG. 2 is a schematic representation of another electric powersport vehicle including the locked rotor protection system.
Figure 4:
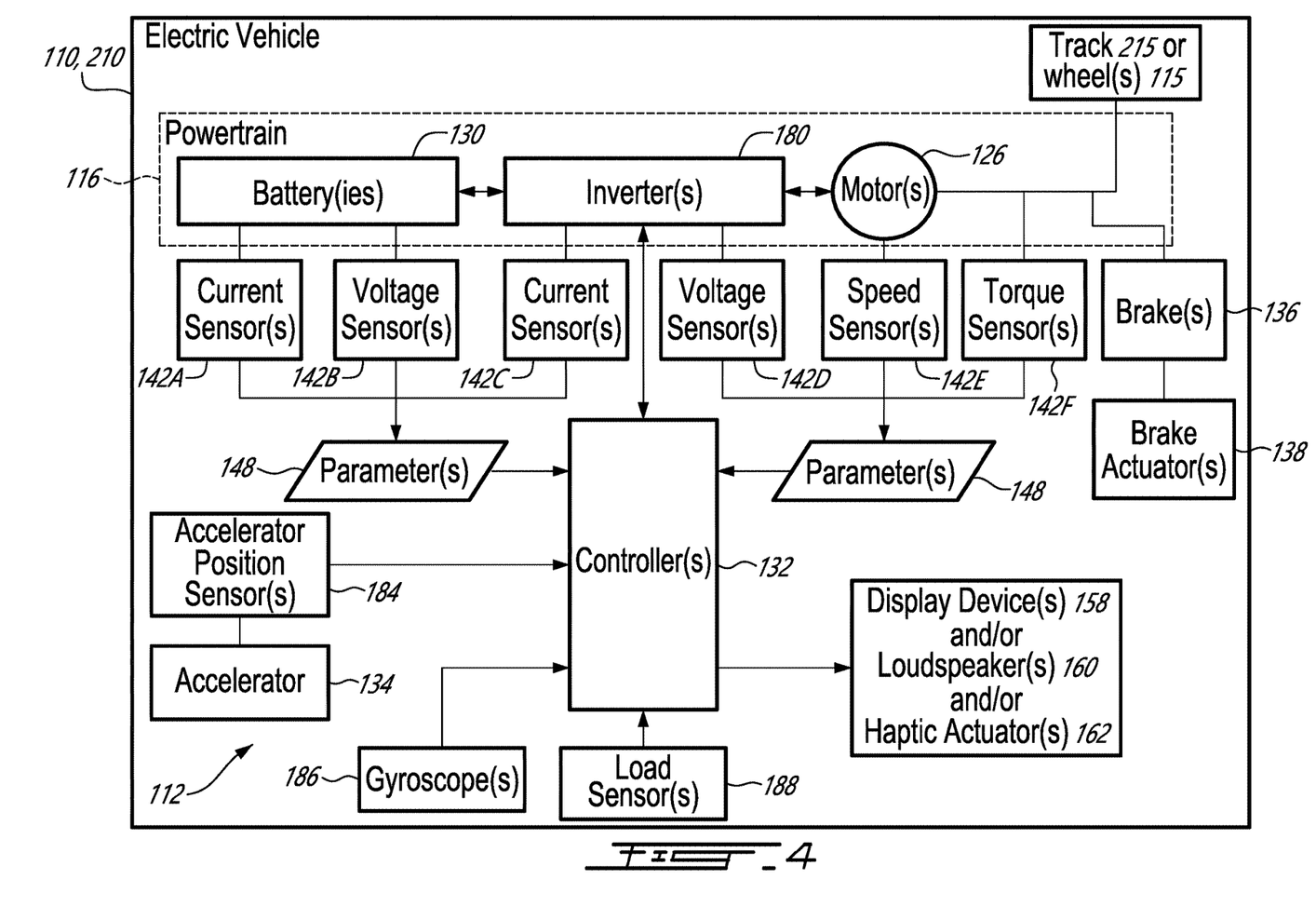
FIG. 4 is a schematic representation of another electric vehicle having a locked rotor protection system.

FIG. 2 is a schematic representation of another electric vehicle 110 including system 12, 112 (shown in FIG. 4) and powertrain 16, 116 (shown in FIG. 4). Vehicle 110 may be an electric UTV including wheels 115 as ground-engaging members. Vehicle 110 may be an all-terrain electric vehicle. Vehicle 110 may be an off-road electric vehicle. Vehicle 110 may include system 12, 112 to protect components of powertrain 16, 116 of vehicle 110 due to various types of obstructions.

Figure 3:
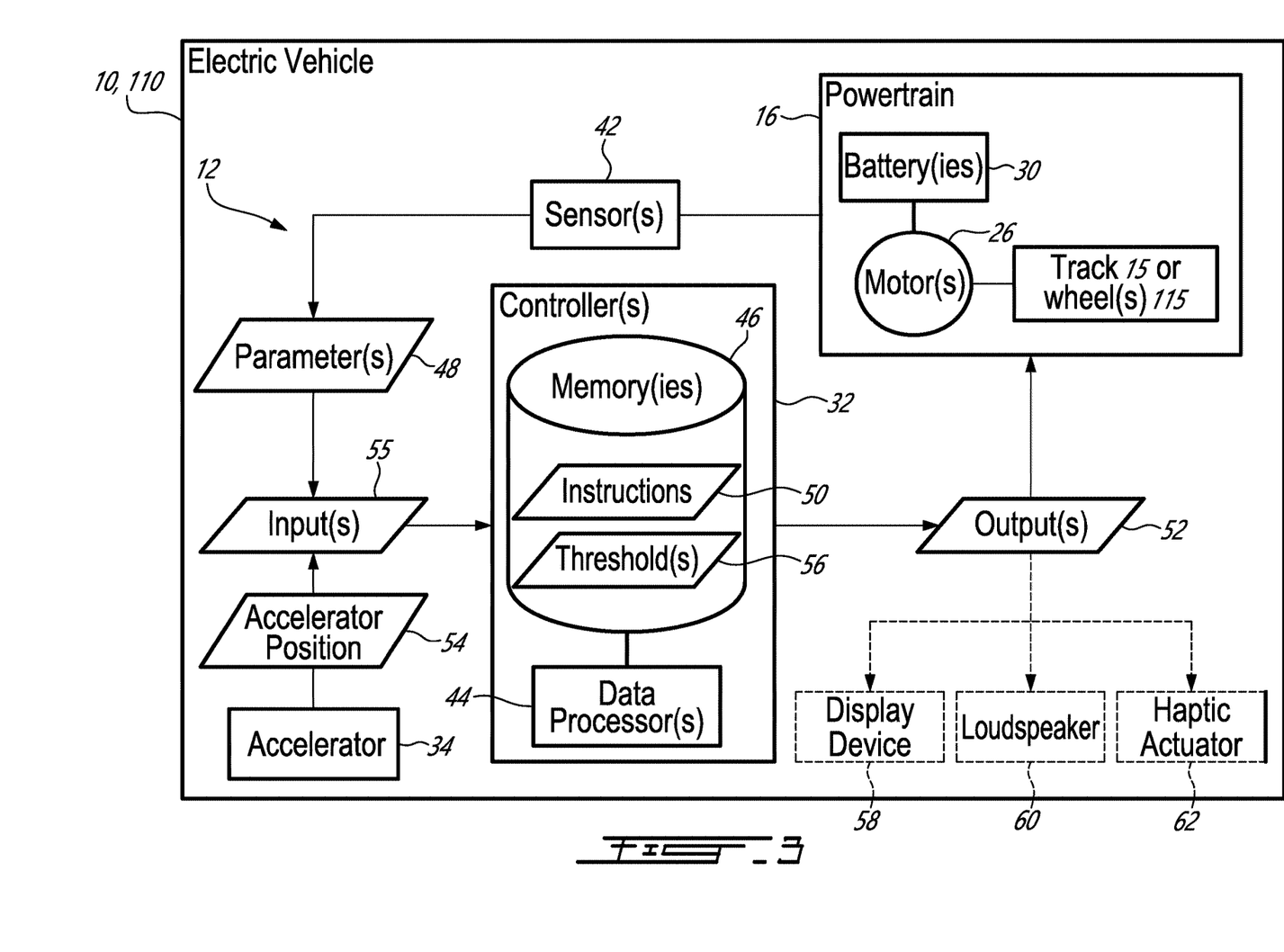
FIG. 3 is a schematic representation of an electric vehicle having a locked rotor protection system.

FIG. 3 is a schematic representation of an exemplary locked rotor protection system 12 suitable for electric vehicles 10 and 110. System 12 is described below in relation to vehicle 10 for clarity. System 12 may include one or more sensors 42 operatively connected to component(s) of powertrain 16 of electric vehicle 10, one or more data processors 44 (referred hereinafter as "processor 44") and non-transitory machine-readable memory 46. Sensor(s) 42 may be configured to sense one or more operating parameters of powertrain 16. Processor 44 and memory 46 may be part of controller 32 configured to control motor 26 and optionally also control other aspects of operation of vehicle 10. Controller 32 may be operatively connected to sensor(s) 42 via wired or wireless connections for example so that one or more parameter(s) 48 acquired via sensor(s) 42 may be received at controller 32 and used by processor 44 in one or more procedures or steps defined by instructions 50 stored in memory 46 and executable by processor 44.

Controller 32 may carry out additional functions than those described herein. Processor 44 may include any suitable device(s) configured to cause a series of steps to be performed by controller 32 so as to implement a computer-implemented process such that instructions 50, when executed by controller 32 or other programmable apparatus, may cause the functions/acts specified in the methods described herein to be executed. Processor 44 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 46 may include any suitable machine-readable storage medium. Memory 46 may include non-transitory computer readable storage medium such as, for example, but not limited to, an electronic, magnetic, optical, electromagnetic, infrared, or semiconductor system, apparatus, or device, or any suitable combination of the foregoing. Memory 46 may include a suitable combination of any type of machine-readable memory that is located either internally or externally to controller 32. Memory 46 may include any storage means (e.g. devices) suitable for retrievably storing machine-readable instructions 50 executable by processor 44.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 46) having computer readable program code (e.g., instructions 50) embodied thereon. Computer program code for carrying out operations for aspects of the present disclosure in accordance with instructions 50 may be written in any combination of one or more programming languages. Such program code may be executed entirely or in part by controller 32 or other data processing device(s). It is understood that, based on the present disclosure, one skilled in the relevant arts could readily write computer program code for implementing the methods described and illustrated herein.

Controller 32 may generate output(s) 52 for controlling the operation of powertrain 16. For example, based on a sensed accelerator position 54 of accelerator 34 and parameter(s) 48 received as input(s) 55, controller 32 may generate output(s) 52 for controlling the delivery of electric power from battery 30 to motor 26 according to instructions 50. Controller 32 may be configured via instructions 50 to, when motor 26 of powertrain 16 of vehicle 10 is being driven, use data indicative of parameter(s) 48 of powertrain 16 to determine that powertrain 16 is obstructed. Parameter(s) 48 may be evaluated against one or more thresholds 56 stored in memory 46 in order to determine whether powertrain 16 is obstructed. Threshold(s) 56 may be fixed or may be variable based on one or more states of vehicle 10. Upon determination of powertrain 16 being obstructed, controller 32 may generate output(s) 52 to automatically initiate one or more actions. The action(s) may be initiated shortly after or substantially immediately upon determining that powertrain 16 is obstructed.

The action(s) initiated by controller 32 may be intended to protect powertrain 16, 116 from damage and/or protect the operator of electric vehicle 10, 110 from an unsafe operating situation. In some embodiments, the action(s) may include limiting the output torque of motor 26 irrespective of the command received at accelerator 34. In some embodiments, the action(s) may include ceasing to drive motor 26. In some embodiments, the action(s) may include shutting off motor 26 and preventing motor 26 from being driven. Shutting off motor 26 may include commanding the motor 26 to achieve substantially zero torque. In other embodiments, shutting off motor 26 may include disconnecting battery 30 from motor 26 by opening battery connectors. In still other embodiments shutting off motor 26 may include operating switches of an inverter so that no power from battery 30 may be delivered to motor 26. In some embodiments, the action(s) may include limiting or reducing an amount of electric power supplied to motor 26 so that the output torque of motor 26 may be limited or reduced. Reducing the amount of electric power supplied to motor 26 may include reducing a magnitude of the electric current supplied to motor 26. In some embodiments, the action(s) may include generating an indication that is perceivable by the operator. In some embodiments, the action(s) may include a combination of an indication perceivable by the operator and controlling a function of powertrain 16 such as limiting the output torque of motor 26.

In some embodiments, the indication perceivable by the operator may include a visual indication, an audible indication, a haptic indication, or any combination of the foregoing. In some embodiments, controller 32 may be operatively connected to display device 58, which may be part of an instrument panel of vehicle 10. Display device 58 may be used to display the visual indication based on output(s) 52 of controller 32. Suitable examples of the visual indication may include a textual indication, a graphic indication, a flashing light, or any combination of the foregoing.

In some embodiments, controller 32 may be operatively connected to loudspeaker 60, which may be part of vehicle 10. Loudspeaker 60 may be used to output the audible indication based on output(s) 52 of controller 32. The audible indication may include an audible tone and/or a voice recording that communicates a suitable message to the operator.

In some embodiments, controller 32 may be operatively connected to haptic actuator 62, which may be installed on vehicle 10 to provide haptic feedback to the operator via handlebar 20 and/or seat 22 (both shown in FIG. 1) for example. In some embodiments, haptic actuator 62 may include an eccentric rotating mass actuator including an unbalanced rotor that induces a vibration when rotated. In some embodiments, haptic actuator 62 may include a linear resonant actuator, which moves a mass in a reciprocal manner. In some embodiments, haptic actuator 62 may include a piezoelectric actuator.

FIG. 4 is a schematic representation of another locked rotor protection system 112 (referred hereinafter as "system 112") suitable for vehicles 110 and 210 (shown in FIG. 8). System 112 is described below in relation to vehicle 110 for clarity. System 112 may include one or more elements of system 12 previously described above. Like elements have been identified using reference numerals that have been incremented by 100. System 112 may include controller 132 operatively connected to control one or more aspects of operation of vehicle 110, receive parameter(s) 148 associated with powertrain 116, determine whether powertrain 116 is obstructed, and generate an output that initiates one or more actions that are intended to protect powertrain 116 and/or the operator in the event that powertrain 116 is determined to be obstructed.

In some embodiments, controller 132 may be configured to control the delivery of electric power to motor 126 by controlling the operation of power inverter 180 or other suitable power electronics module operatively disposed between battery 130 and electric motor 126. Inverter 180 may include suitable electronic switches (e.g., insulated gate bipolar transistor(s)) to provide motor 126 with electric power having the desired characteristics to implement the desired performance of vehicle 110 based on an actuation of accelerator 134 by the operator indicating a command to propel vehicle 110. Motor 126 may in turn drive one or more ground-engaging members such as track 215 of vehicle 210 (shown in FIG. 8) or one or more wheels 115 of vehicle 110. In case of the vehicle being a PWC, motor 126 may be drivingly coupled to an impeller which could potentially become obstructed by a foreign object.

Vehicle 110 may include brake 136 and brake actuator 138. Vehicle 110 may include accelerator 134 and a suitable accelerator position sensor 184 that may sense a position of accelerator 134. Accelerator position sensor 184 may be operatively connected to controller 132 so that a command for propelling vehicle 110 in the form of signal generated by acceleration position sensor 184 and indicative of an actuation of accelerator 134 by the operator may be communicated to controller 132. The delivery of electric power to motor 126 may be controlled according to the command for propelling vehicle 110 during normal operation.

In some embodiments, parameter(s) 148 of powertrain 116 may include data indicative of an amount of electric power being supplied to motor 126. For example, parameter(s) 148 may be acquired via one or more current sensors 142A, 142C and/or one or more voltage sensors 142B, 142D operatively connected to battery 130 and controller 132, or to inverter 180 and controller 132.

In some embodiments, parameter(s) 148 of powertrain 116 may include data indicative of an operating speed of motor 126. The operating speed of motor 126 may be acquired via speed sensor(s) 142E operatively connected to motor 126 and controller 132. Speed sensor(s) 142E may include any suitable instrument such as a rotary encoder or tachometer suitable for measuring the angular position and rotation speed (e.g., revolutions per minute) of motor 126 and/or of drive shaft 28 (shown in FIG. 1).

In some embodiments, parameter(s) 148 of powertrain 116 may include data indicative of an output torque of motor 126. The output torque of motor 126 may be measured directly via torque sensor 142F or may be inferred based on the amount of electric power being supplied to motor 126 for example. In some embodiments, torque sensor 142F may include a rotary (i.e., dynamic) torque transducer suitable for measuring torque on a rotating shaft.

In some embodiments, system 112 may also include gyroscope 186 or other suitable device for measuring an orientation of vehicle 110. In some embodiments, system 112 may include load (e.g., force) sensor 188 such as a load cell for measuring a load (weight) carried by vehicle 110. As explained below, the determination of whether powertrain 116 is obstructed may be made using thresholds such as threshold(s) 56 shown in FIG. 3 that may be fixed or variable based on the orientation of vehicle 110 and/or the load carried by vehicle 110.

Controller 132 may be operatively connected to display device 158, loudspeaker 160 and/or haptic actuator 162 for causing an indication perceivable by the operator to be generated.

Figure 5:
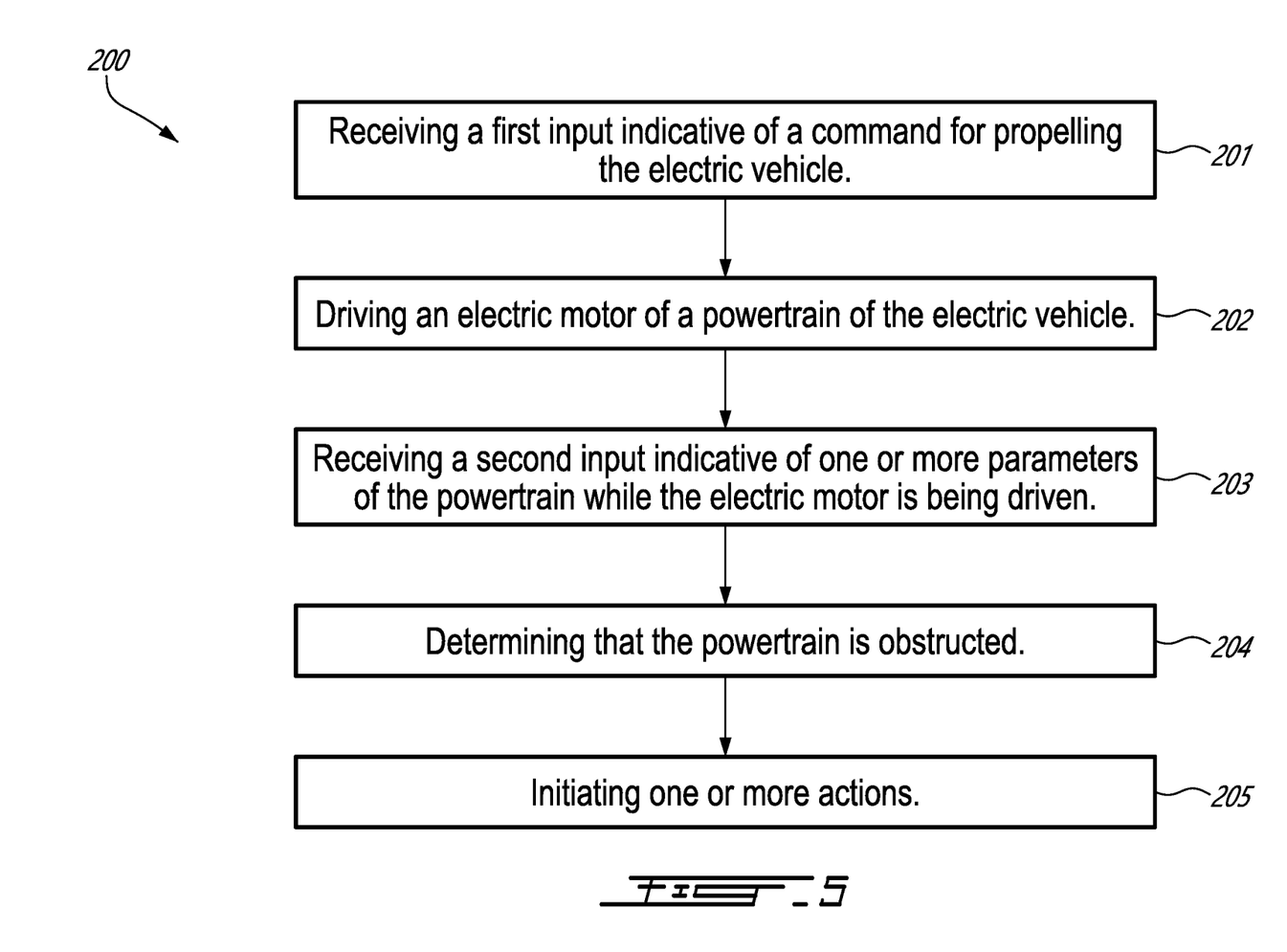
FIG. 5 is a flow diagram of a method of operating an electric vehicle.

FIG. 5 is a flow diagram of a method 200 of operating any of electric vehicles 10, 110, 210, or another electric vehicle. For example, machine-readable instructions 50 may be configured to cause controller 32 to perform at least part of method 200. Aspects of method 200 may be combined with aspects of other methods described herein. Aspects of vehicles 10, 110 and 210 may also be incorporated into method 200. In various embodiments, method 200 may include:

receiving a first input such as accelerator position 54 (shown in FIG. 3) indicative of a command for propelling electric vehicle 10, 110, 210 (block 201);
after receiving the first input, driving motor 26, 126 of powertrain 16, 116 of electric vehicle 10, 110, 210 (block 202);
receiving a second input indicative of one or more parameters 48, 148 of powertrain 16, 116 while motor 26, 126 is being driven (block 203);
determining, based on the second input, that powertrain 16, 116 is obstructed (block 204); and
after determining that powertrain 16, 116 is obstructed, generating an output such as output 52 shown in FIG. 3 to initiate one or more actions (block 205).

In some embodiments, the second input may include an operating speed of motor 26, 126 while motor 26, 126 is being driven. In some embodiments, the second input may include an output torque of motor 26, 126 while motor 26, 126 is being driven. In some embodiments, the second input may include a magnitude of an electric current delivered to motor 26, 126 while motor 26, 126 is being driven. The determination of powertrain 16, 116 being obstructed may be made using only one parameter 48, 148 or using a combination of two or more parameters 48, 148.

In some embodiments, the one or more actions may include any suitable action(s) intended to protect powertrain 16, 116 of vehicle 10, 110, 210. The action(s) may be intended to mitigate the consequences of the obstruction on powertrain 16, 116. For example, the action(s) may include limiting the output torque of motor 26, 126, generating an indication perceivable by the operator, and/or another action disclosed herein.

Figure 6:
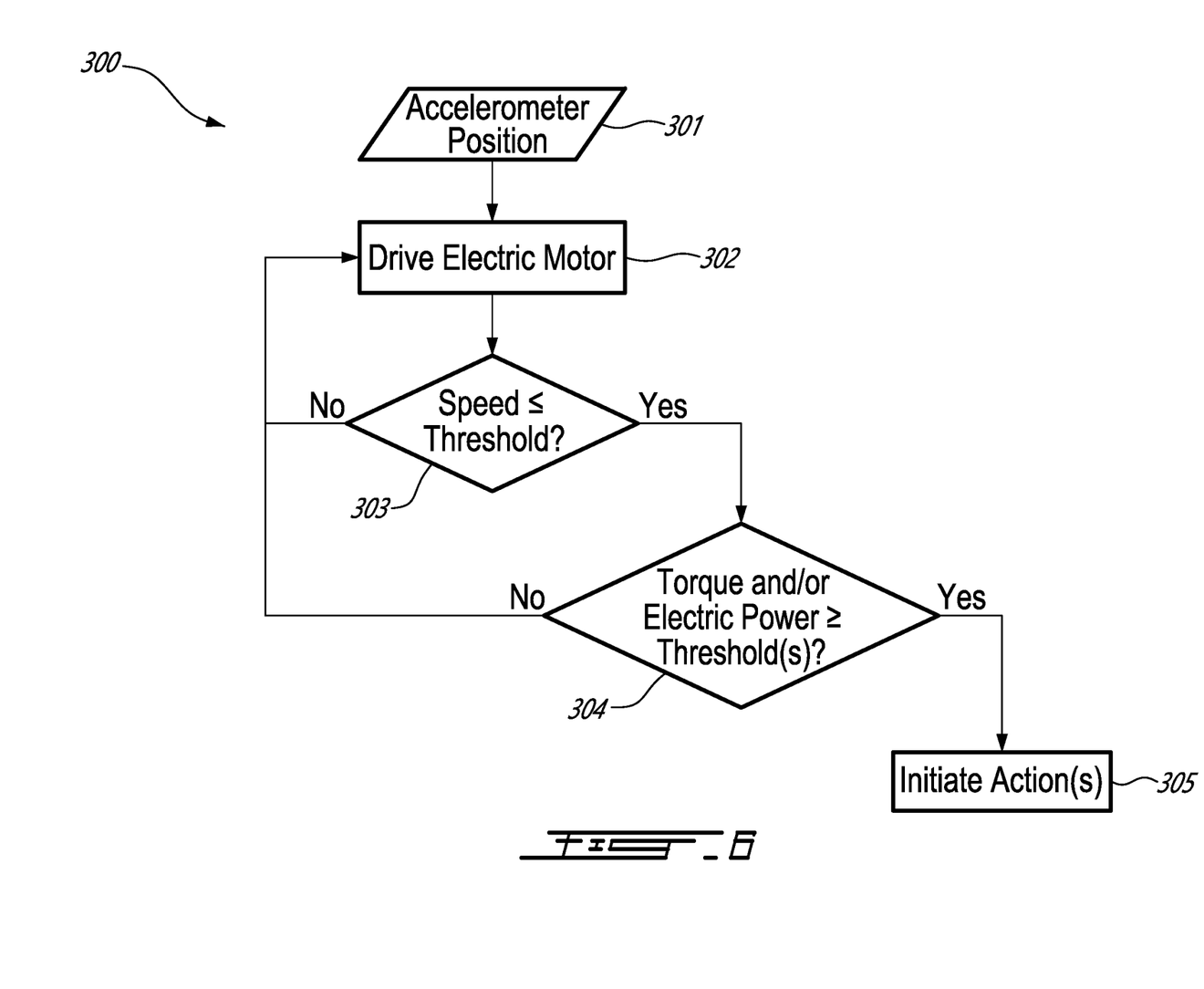
FIG. 6 is a flow diagram of another method of operating an electric vehicle.

FIG. 6 is a flow diagram of another method 300 of operating electric vehicles 10, 110, 210 or other electric vehicles. For example, machine-readable instructions 50 may be configured to cause controller 32 to perform at least part of method 300. Aspects of method 300 may be combined with aspects of other methods described herein. Aspects of vehicles 10, 110 and 210 may also be incorporated into method 300. Method 300 may be incorporated into method 200 and used to determine whether powertrain 16, 116 is obstructed.

In various embodiments, method 300 may include receiving data indicative of a command (e.g., position of accelerator 34, 134) for propelling vehicle 10, 110, 210 (block 301) and driving motor 26, 126 based on the command (block 302). At block 303 an operating speed of motor 26, 126 while motor 26, 126 is being driven may be compared to a speed threshold. The speed threshold may be relatively low (e.g., 50 revolutions per minute) and may be intended to determine that powertrain 16, 116 may be obstructed and that motor 26, 126 may be locked and rotating slower than expected for the applicable command. When the operating speed is higher than the speed threshold, method 300 may return to driving motor 26, 126 at block 302. However, when the operating speed is lower than the speed threshold, method 300 may proceed to block 304.

At block 304, a magnitude of the input electric current to motor 26, 126 and/or the output torque of motor 26, 126 may be compared to applicable current and/or torque thresholds. The current threshold and torque threshold (e.g., 100 newton meters) may be relatively high and may be intended to detect a low speed and high torque operating condition of motor 26, 126 indicating that powertrain 16, 116 may be obstructed and that motor 26, 126 may be locked. The current and/or torque thresholds may be selected to provide suitable rotor-lock detection and may be stored as threshold(s) 56 in memory 46 (shown in FIG. 3). In some embodiments, the current and/or torque thresholds may be selected to be below a maximum output torque of motor 26, 126. When the output torque and/or input current are lower than the selected threshold(s) 56, this may indicate that powertrain 16, 116 is not obstructed and method 300 may return to driving electric motor at block 302. However, when the output torque and/or the input current are equal to or greater than the applicable threshold(s) 56, this may indicate that powertrain 16, 116 is obstructed and method 300 may proceed to block 305 where one or more actions intended to protect powertrain 16, 116 and/or the operator may be initiated.

In some embodiments of method 300, the order to blocks 303 and 304 may be reversed.

In an exemplary non-limiting scenario in reference to FIG. 1, obstruction 40 (e.g., branch or rock) may become stuck within track 15 of vehicle 10 (FIG. 1) and obstruct the movement of track 15 without the operator noticing the presence of obstruction 40. When the operator actuates accelerator 34, controller 32 may cause electric power to be delivered to motor 26 for driving the motor 26. However, due to obstruction 40, the inability of track 15 to move may in turn prevent the rotor within motor 26 from rotating. If the operator is still unaware of the obstruction and further increases the actuation of accelerator 34 in an attempt to get vehicle 10 to move, this may cause increased current to flow to the motor 26 thereby putting the motor 26 in a high-torque condition. In the absence of the rotor protection system 12 described herein, if obstruction 40 would suddenly become dislodged from track 15 (e.g., the obstructing branch breaking), while the operator is actuating accelerator 34, motor 26 could potentially respond quickly and cause vehicle 10 to suddenly accelerate in a manner that is unexpected to the operator. To avoid such a situation, in a non-limiting embodiment, the rotor protection system 12 may detect the low rotational speed and high torque (e.g., high current) condition of motor 26 and initiate a remedial action intended to protect powertrain 16 and/or the operator. In some embodiments, the action may be shutting off motor 26 (i.e. causing the motor 26 to achieve a substantially zero torque condition).

Figure 7:
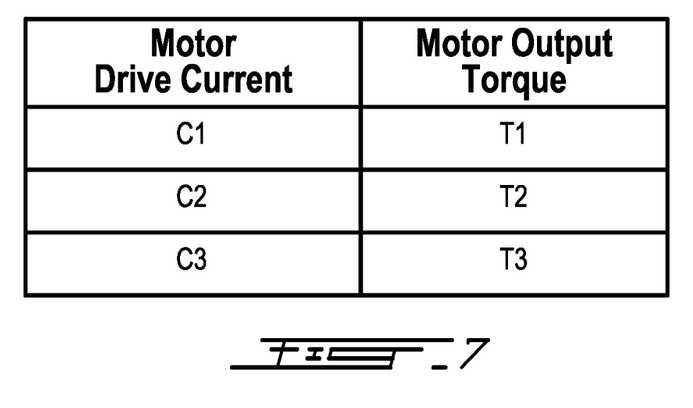
FIG. 7 is a table illustrating a relation between an electric current supplied to an electric motor of an electric vehicle, and an output torque of the electric motor.

FIG. 7 is a table illustrating a relation between magnitudes of input electric current C1-C3 supplied to motor 26, 126 of electric vehicle 10, 110, 210, and corresponding output torques T1-T3 of motor 26, 126 associated with the magnitudes of input electric current C1-C3. In various embodiments of methods 200 and 300, the output torque of motor 26, 126 may be measured directly via torque sensor 142F (shown in FIG. 4), or may be inferred based on the input electric current C1-C3. For example, the table of FIG. 7 may be a look-up table stored in memory 46 (shown in FIG. 3) and defining a relation between output torque and input current. This relation may be used to infer the output torque based on the input current.

Figure 8:
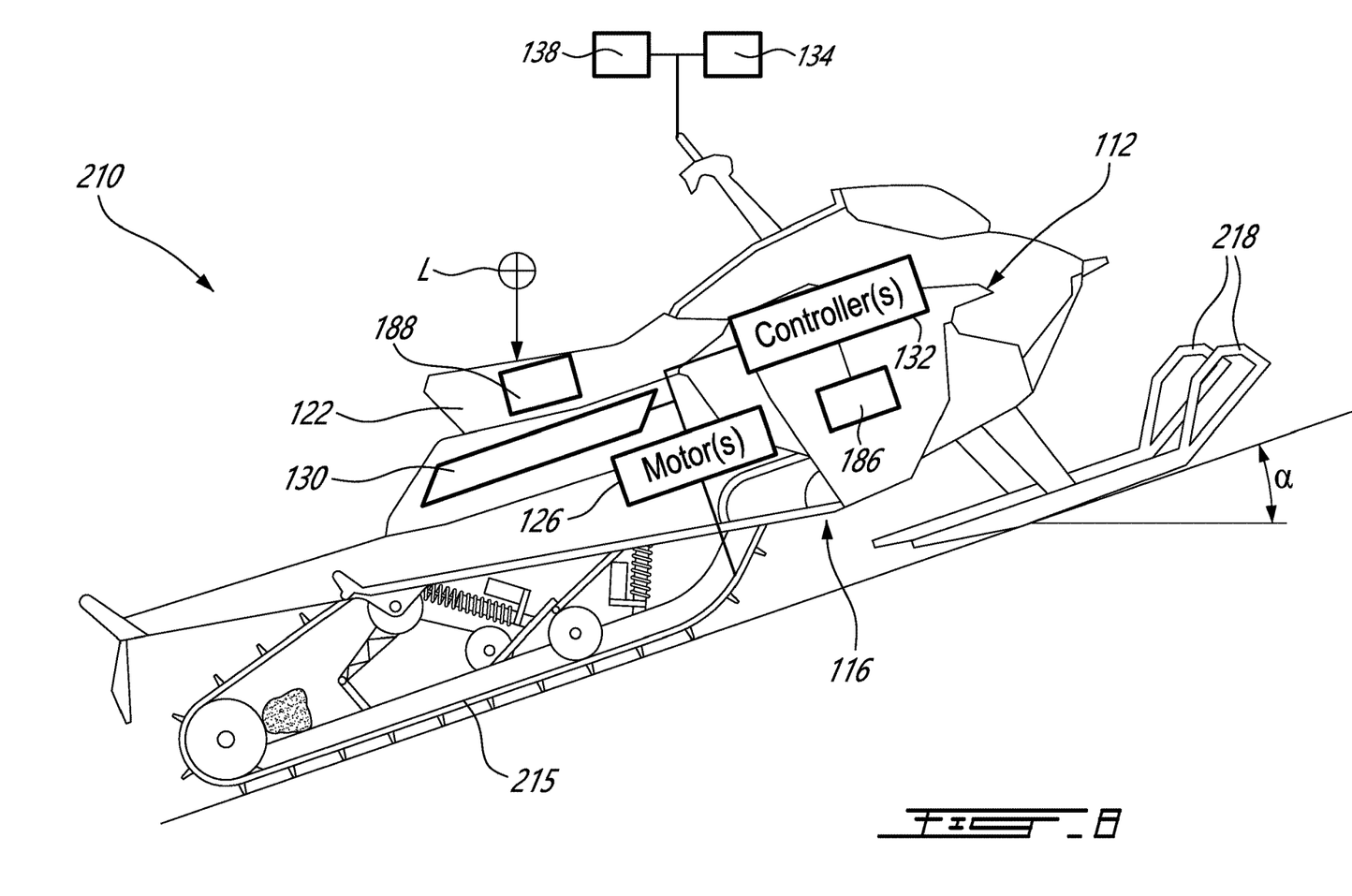
FIG. 8 is a schematic representation of another powersport electric vehicle having an inclined orientation.

FIG. 8 is a schematic representation of electric vehicle 210 of a same type as vehicle 10 but including system 112 and having an inclined orientation. Vehicle 210 may include endless track 215, ski(s) 218, and powertrain 116 including electric motor 126 and battery 130. Vehicle 210 may include gyroscope 186 attached to a frame or other component of vehicle 210 and configured to measure an orientation such as angle α of inclination of vehicle 210 relative to a levelled orientation substantially parallel to a plane of the horizon. Vehicle 210 may include load sensor 188 integrated with seat 22 or a suspension component of vehicle 210, and configured to measure a load L carried by vehicle 210. Load sensor 188 may be configured and disposed to measure a passenger load, cargo load or a total load carried by vehicle 210. In some embodiments of methods 200 and 300, the electric current and/or torque thresholds used to identify the obstructed condition of powertrain 116 may be variable based on one or more conditions such as the magnitude of load L and the angle α of inclination of vehicle 210.

Figure 9:
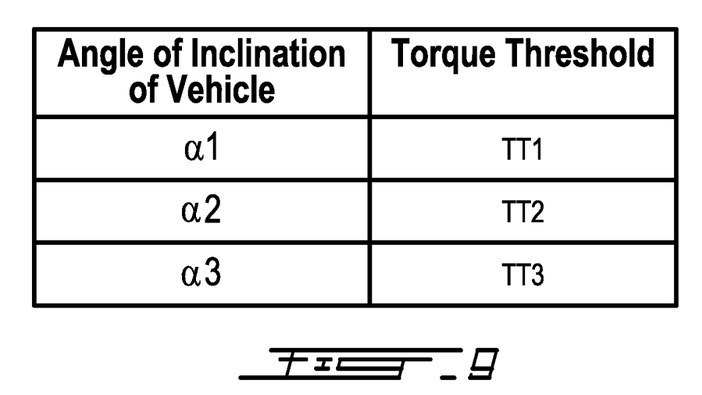
FIG. 9 is a table illustrating a relation between an angle of inclination of the electric vehicle of FIG. 8, and a variable torque threshold associated with the locked rotor protection system.

FIG. 9 is a table illustrating a relation between angles α1-α3 of inclination of electric vehicle 210 shown in FIG. 8, and corresponding torque thresholds TT1-TT3 associated with system 112 that may be used in methods 200 and 300. The table of FIG. 9 may be a look-up table stored as threshold(s) 56 in memory 46 (shown in FIG. 3). In some embodiments, FIG. 9 may represent a relation where increasing angles α1-α3 of inclination (i.e., α3>α1) correspond to increasing torque thresholds TT1-TT3 (i.e., TT3>TT1).

Figure 10:
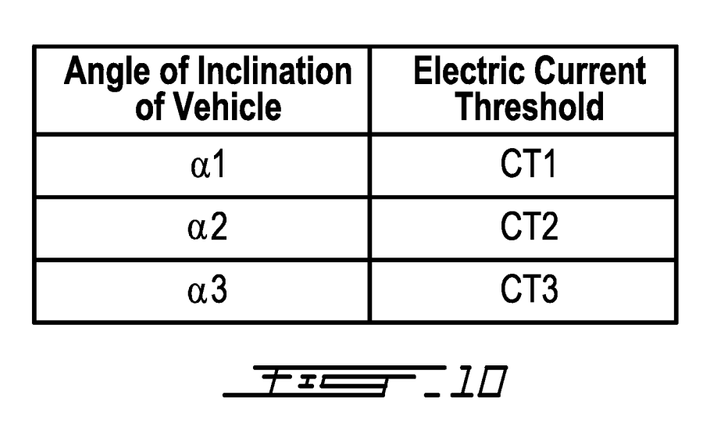
FIG. 10 is a table illustrating a relation between the angle of inclination of the electric vehicle of FIG. 8, and a variable electric current threshold associated with the locked rotor protection system.

FIG. 10 is a table illustrating a relation between angles α1-α3 of inclination of electric vehicle 210 shown in FIG. 8, and corresponding threshold electric currents TC1-TC3 associated with system 112 that may be used in methods 200 and 300. The table of FIG. 10 may be a look-up table stored as threshold(s) 56 in memory 46 (shown in FIG. 3). In some embodiments, FIG. 10 may represent a relation where increasing angles α1-α3 of inclination (i.e., α3>α1) correspond to increasing electric current thresholds (i.e., CT3>CT1).

Figure 11:
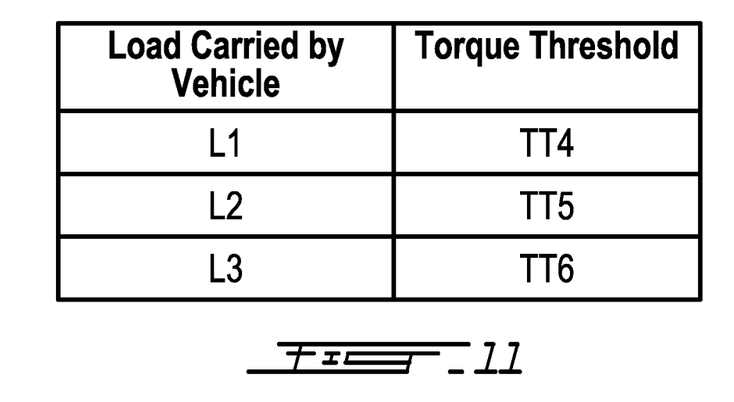
FIG. 11 is a table illustrating a relation between a load carried by the electric vehicle of FIG. 8, and the variable torque threshold associated with the locked rotor protection system.

FIG. 11 is a table illustrating a relation between loads L1-L3 carried by electric vehicle 210 shown in FIG. 8, and corresponding torque thresholds TT4-TT6 associated with system 112 that may be used in methods 200 and 300. The table of FIG. 11 may be a look-up table stored as threshold(s) 56 in memory 46 (shown in FIG. 3). In some embodiments, FIG. 11 may represent a relation where increasing loads L1-L3 (i.e., L3>L1) carried by electric vehicle 210 correspond to increasing torque thresholds TT4-TT6 (i.e., TT6>TT4).

Figure 12:
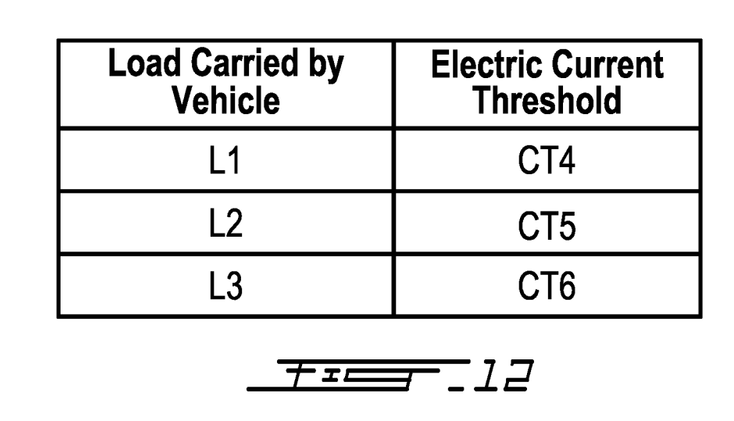
FIG. 12 is a table illustrating a relation between the load carried by the electric vehicle of FIG. 8, and the variable electric current threshold associated with the locked rotor protection system.

FIG. 12 is a table illustrating a relation between loads L1-L3 carried by electric vehicle 210 shown in FIG. 8, and corresponding electric current thresholds CT4-CT6 associated with system 112 that may be used in methods 200 and 300. The table of FIG. 12 may be a look-up table stored as threshold(s) 56 in memory 46 (shown in FIG. 3). In some embodiments, FIG. 12 may represent a relation where increasing loads L1-L3 (i.e., L3>L1) carried by electric vehicle 210 correspond to increasing electric current thresholds CT4-CT6 (i.e., CT6>CT4).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of operating an electric vehicle, the method comprising:
   receiving a first input indicative of a command for propelling the electric vehicle;
   after receiving the first input, driving an electric motor of a powertrain of the electric vehicle;
   receiving a second input indicative of one or more parameters of the powertrain while the electric motor is being driven, the second input including an operating speed of the electric motor;

determining, based at least in part on the operating speed of the electric motor being equal to or below a speed threshold, that the powertrain is obstructed; and after determining that the powertrain is obstructed, generating an output that initiates one or more actions.

2. The method as defined in claim 1, wherein the second input is indicative of an output torque of the electric motor.

3. The method as defined in claim 2, wherein determining that the powertrain is obstructed includes determining that the output torque of the electric motor is equal to or above a torque threshold.

4. The method as defined in claim 3, wherein the torque threshold is variable.

5. The method as defined in claim 4, wherein the torque threshold is based on an inclination of the electric vehicle.

6. The method as defined in claim 4, wherein the torque threshold is based on a load carried by the electric vehicle.

7. The method as defined in claim 3, wherein:
the second input is indicative of an amount of electric power supplied to the electric motor when the electric motor is driven; and
the method includes inferring the output torque of the electric motor based on the second input.

8. The method as defined in claim 1, wherein the second input is indicative of an amount of electric power supplied to the electric motor.

9. The method as defined in claim 1, wherein:
the second input includes a magnitude of an electric current supplied to the electric motor; and
determining that the powertrain is obstructed includes determining that the magnitude of the electric current supplied to the electric motor is equal to or above a current threshold.

10. The method as defined in claim 9, wherein the current threshold is variable.

11. The method as defined in claim 10, wherein the current threshold is based on an inclination of the electric vehicle.

12. The method as defined in claim 10, wherein the current threshold is based on a load carried by the electric vehicle.

13. The method as defined in claim 1, wherein the one or more actions include ceasing to drive the electric motor.

14. The method as defined in claim 1, wherein the one or more actions include reducing an electric power supplied to the electric motor.

15. The method as defined in claim 1, wherein the one or more actions include generating an indication perceivable by an operator of the electric vehicle.

16. The method as defined in claim 15, wherein the indication includes at least one of the following: a visual indication, an audible indication and a haptic indication.

17. A locked rotor protection system for an electric vehicle, the system comprising:
one or more sensors operatively connected to a powertrain of the electric vehicle for sensing one or more parameters of the powertrain;
one or more data processors operatively connected to the one or more sensors; and
non-transitory machine-readable memory storing instructions executable by the one or more data processors and configured to cause the one or more data processors to:
when an electric motor of the powertrain of the electric vehicle is being driven, use data indicative of the one or more parameters of the powertrain to determine that the powertrain is obstructed; and
after determining that the powertrain is obstructed, generate an output that initiates one or more actions related to the electric motor.

18. The system as defined in claim 17, wherein:
the one or more parameters of the powertrain are indicative of an output torque of the electric motor and an operating speed of the electric motor;
determining that the powertrain is obstructed includes:
determining that the operating speed of the electric motor is equal to or below a speed threshold; and
determining that the output torque of the electric motor is equal to or above a torque threshold.

19. The system as defined in claim 18, wherein the instructions are configured to cause the one or more data processors to infer the output torque of the electric motor based on a magnitude of an electric current supplied to the electric motor when the electric motor is driven.

20. The system as defined in claim 17, wherein:
the one or more parameters of the powertrain include a magnitude of an electric current supplied to the electric motor and an operating speed of the electric motor when the electric motor is driven;
determining that the powertrain is obstructed includes:
determining that the operating speed of the electric motor is equal to or below a speed threshold; and
determining that the magnitude of the electric current supplied to the electric motor is equal to or above a current threshold.

21. The system as defined in claim 17, wherein the one or more actions include one of the following: ceasing to drive the electric motor; reducing an electric power supplied to the electric motor; and, shutting off the electric motor.

22. An electric powersport vehicle with locked rotor protection, the electric powersport vehicle comprising:
a powertrain for propelling the electric powersport vehicle, the powertrain including an electric motor and a battery for supplying electric power to the electric motor;
an accelerator for receiving an input indicative of a command for propelling the electric powersport vehicle from an operator of the electric powersport vehicle; and
a controller operatively connected to the accelerator and to the powertrain, the controller being configured to:
in response to the input received at the accelerator, drive the electric motor of the powertrain;
determine that the powertrain is obstructed by:
determining that an operating speed of the electric motor is equal to or below a speed threshold; and
determining at least one of the following: that an amount of electric power supplied to the electric motor is equal to or above a power threshold, and that an output torque of the electric motor is equal to or above a torque threshold; and
after determining that the powertrain is obstructed, generate an output that initiates one or more actions for protecting the powertrain.

23. The electric powersport vehicle as defined in claim 22, wherein the electric powersport vehicle is a snowmobile.

24. The electric powersport vehicle as defined in claim 22, wherein the electric powersport vehicle is a utility task vehicle.

* * * * *